United States Patent
Watahiki et al.

(10) Patent No.: US 6,886,042 B1
(45) Date of Patent: Apr. 26, 2005

(54) RESOURCE RESERVATION MANAGEMENT APPARATUS

(75) Inventors: Tomoaki Watahiki, Takatsuki (JP); Hajime Maekawa, Osaka (JP); Masao Ikezaki, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 528 days.

(21) Appl. No.: 09/603,964

(22) Filed: Jun. 26, 2000

(30) Foreign Application Priority Data

Jun. 29, 1999 (JP) .......................................... 11-184295

(51) Int. Cl.⁷ ............................................. G06F 15/16
(52) U.S. Cl. ........................... 709/232; 725/39; 725/95
(58) Field of Search .......................... 709/232; 725/39, 725/95, 40, 46, 49; 455/434, 450; 370/436, 352; 348/555

(56) References Cited

U.S. PATENT DOCUMENTS

| | | | |
|---|---|---|---|
| 5,850,418 A * | 12/1998 | Van De Kerkhof | 375/240 |
| 5,884,181 A * | 3/1999 | Arnold et al. | 455/450 |
| 5,900,915 A * | 5/1999 | Morrison | 348/555 |
| 6,178,175 B1 * | 1/2001 | Zumkeller | 370/436 |
| 6,305,018 B1 * | 10/2001 | Usui et al. | 725/49 |
| 6,374,109 B1 * | 4/2002 | Shaheen et al. | 455/434 |
| 6,434,141 B1 * | 8/2002 | Oz et al. | 370/352 |
| 6,438,752 B1 * | 8/2002 | McClard | 725/46 |
| 6,532,589 B1 * | 3/2003 | Proehl et al. | 725/40 |

FOREIGN PATENT DOCUMENTS

| | | |
|---|---|---|
| EP | 0 921 472 A2 | 6/1999 |
| JP | 10-327173 | 12/1998 |
| JP | 11-055626 | 2/1999 |
| JP | 11-168473 | 6/1999 |

OTHER PUBLICATIONS

Japanese Office Action issued Jul. 21, 2004.

* cited by examiner

*Primary Examiner*—John Follansbee
*Assistant Examiner*—Jungwon Chang
(74) *Attorney, Agent, or Firm*—Smith, Gambrell & Russell, LLP

(57) ABSTRACT

A resource reservation management apparatus that manages equipment resources connected to an AV network includes an EPG processing device for acquiring starting/ending time information of a broadcast program from an EPG (electronic program guide) superimposed on a broadcast wave, a frequency band information processing device for acquiring frequency band information of the program from the EPG, a frequency band information processing device for time managing an AV network frequency band resource reservation management table, a controller, and a communication interface using an allocated secured frequency band at the start time of the reserved program. Upon receiving a reservation request, the controller acquires the frequency band at the starting/ending time information of the reserved program and, with reference to the table, determines whether the frequency band of the reserved program can be allocated so that, when the band can be allocated, reservation of the band is registered in the table.

10 Claims, 9 Drawing Sheets

RESOURCE RESERVATION MANAGEMENT APPARATUS

BACKGROUND OF THE INVENTION

1. Field of the Invention

The present invention relates to a resource reservation management apparatus used in an AV network, where AV apparatuses are connected, for transferring data streams among the AV apparatuses.

2. Related Art of the Invention

A resource management apparatus of the prior art will be described below with reference to accompanying drawings, taking an isochronous resource manager of the IEEE1394 standard.

FIG. 8 shows the constitution of the resource management apparatus of the prior art. In FIG. 8, reference numeral 801 denotes the resource management apparatus, 802 denotes a frequency band management table, 803 denotes a channel management table, 804 denotes a controller and 805 denotes a communication interface.

The resource management apparatus 801 performs a function of managing network resources to ensure correct transmission of AV data stream. FIG. 9 shows an example of the AV network constitution provided with the resource management apparatus 801.

The resource management apparatus 801 of the prior art does not perform prospective resource management that takes into account future events. That is, upon receipt of a frequency band allocation request from a user, the resource management apparatus 801 checks frequency bands currently not in use stored in the frequency band resource management table 802, and compares them with the requested frequency band. In case the frequency band can be allocated, the controller 804 notifies the user of the permission of allocation, while the frequency band resource management table 802 is updated at the same time.

Upon receipt of a channel allocation request, on the other hand, the channel management table 803 is checked for an unused channel registered therein, with an available channel being notified to the user and the channel management table 803 being updated.

The user transfers the AV data stream using the assigned channel within the frequency band permitted.

In FIG. 9, reference numeral 901 denotes the resource management apparatus 801, 902 denotes a set-top box (hereinafter STB), 903 denotes a video cassette recorder (hereinafter VCR) and 904 denotes an AV data stream.

When video recording of a digital broadcast program received with the STB 902 by means of the VCR 903 is to be reserved, the resource management apparatus 901 starts by retrieving program starting/ending time information from an electronic program guide (hereinafter EPG).

When the reservation start time comes, the STB 902 acquires a currently available network resource that is monitored by the resource management apparatus 901, for the first time as described above, and sends an AV data stream 904 from the STB 902 using an isochronous packet.

Then the VCR 903 is enabled to receive and record the AV data stream 904.

However, there has been such problems as described below with the constitution described above.

When a user (A) reserves at 10:00 a.m. video recording for time period of 8:00 to 10:00 p.m. and another user(B) reserves at 11:00 a.m. video recording for time period of 7:00 to 9:00 p.m., the video recording of the user(B) is performed at 7:00 to 9:00 p.m. to consume full frequency band, and therefore the video recording for the user(A) can not be performed. That is user(A) who reserved before the user (B) can not record on account of the user(B) who reserved after the user(A).

SUMMARY OF THE INVENTION

The present invention aims at solving the problems described above, and an object thereof is to provide a network resource reservation management apparatus that is capable of reserving network resources.

The $1^{st}$ invention of the present invention (corresponding to claim 1) is a resource reservation management apparatus for AV network that manages equipment resources connected to a network, comprising:

EPG processing means for acquiring starting/ending time information of a broadcast program from EPG (electronic program guide) that is sent while being superimposed on the broadcast wave;

frequency band information processing means for acquiring the frequency band information of the broadcast program;

frequency band resource management means for performing time management of the frequency band resource of the AV network by using a resource reservation management table;

a controller that, upon receiving a reservation request, acquires the frequency band of a reserved program of the request from said frequency band information processing means and the starting/ending time information of the reserved program from said EPG processing means and, with reference to said resource reservation management table, determines whether the frequency band of the reserved program can be allocated so that, when the frequency band can be allocated, reservation of the frequency band is registered in said resource reservation management table, and communication via a communication interface using allocated secured frequency band is carried out when the start time of the reserved program is reached.

The $2^{nd}$ invention of the present invention (corresponding to claim 2) is a resource reservation management apparatus as described in the $1^{st}$ invention, wherein said frequency band information processing means acquires the frequency band information of the broadcast program with superimposed on said broadcast wave.

The $3^{rd}$ invention of the present invention (corresponding to claim 3) is a resource reservation management apparatus as described in the $1^{st}$ invention, wherein said frequency band information processing means acquires the frequency band information of said broadcast program via the Internet.

The $4^{th}$ invention of the present invention (corresponding to claim 4) is a resource reservation management apparatus as described in the $1^{st}$ invention, wherein said frequency band information processing means acquires the frequency band information of said broadcast program from communication equipment.

The $5^{th}$ invention of the present invention (corresponding to claim 5) is a resource reservation management apparatus as described in the $1^{st}$ invention, wherein said frequency band information processing means acquires the frequency band information of said broadcast program from a recording medium.

The 6th invention of the present invention (corresponding to claim 6) is a resource reservation management apparatus as described in the it invention, wherein
said frequency band information processing means acquires the frequency band information of said broadcast program from information input by a user.

The 7th invention of the present invention (corresponding to claim 7) is a resource reservation management apparatus as described in any of the 1st through 6th inventions, wherein
in case transmission of a program is requested without reservation, said controller makes reference to said resource reservation management table thereby to determine whether the requested frequency band of the broadcast program can be allocated and, when the frequency band can be allocated, records the reservation of the frequency band in said resource reservation management table.

The 8th invention of the present invention (corresponding to claim 8) is a resource reservation management apparatus as described in any of the 1st through 6th inventions, wherein
a non-reservable frequency band is provided in said resource reservation management table.

The 9th invention of the present invention (corresponding to claim 9) is a medium that carries programs and/or data for achieving all or part of the functions of all or part of the means of the resource reservation management apparatus as described in any of the 1st through 6th inventions and can be processed by means of a computer.

The 10th invention of the present invention (corresponding to claim 10) is an information complex comprising programs and/or data for achieving all or part of the functions, of all or part of the means of the resource reservation management apparatus as described in any of the 1st through 6th inventions, by means of a computer.

DESCRIPTION OF REFERENCE NUMERALS

Figure 1:
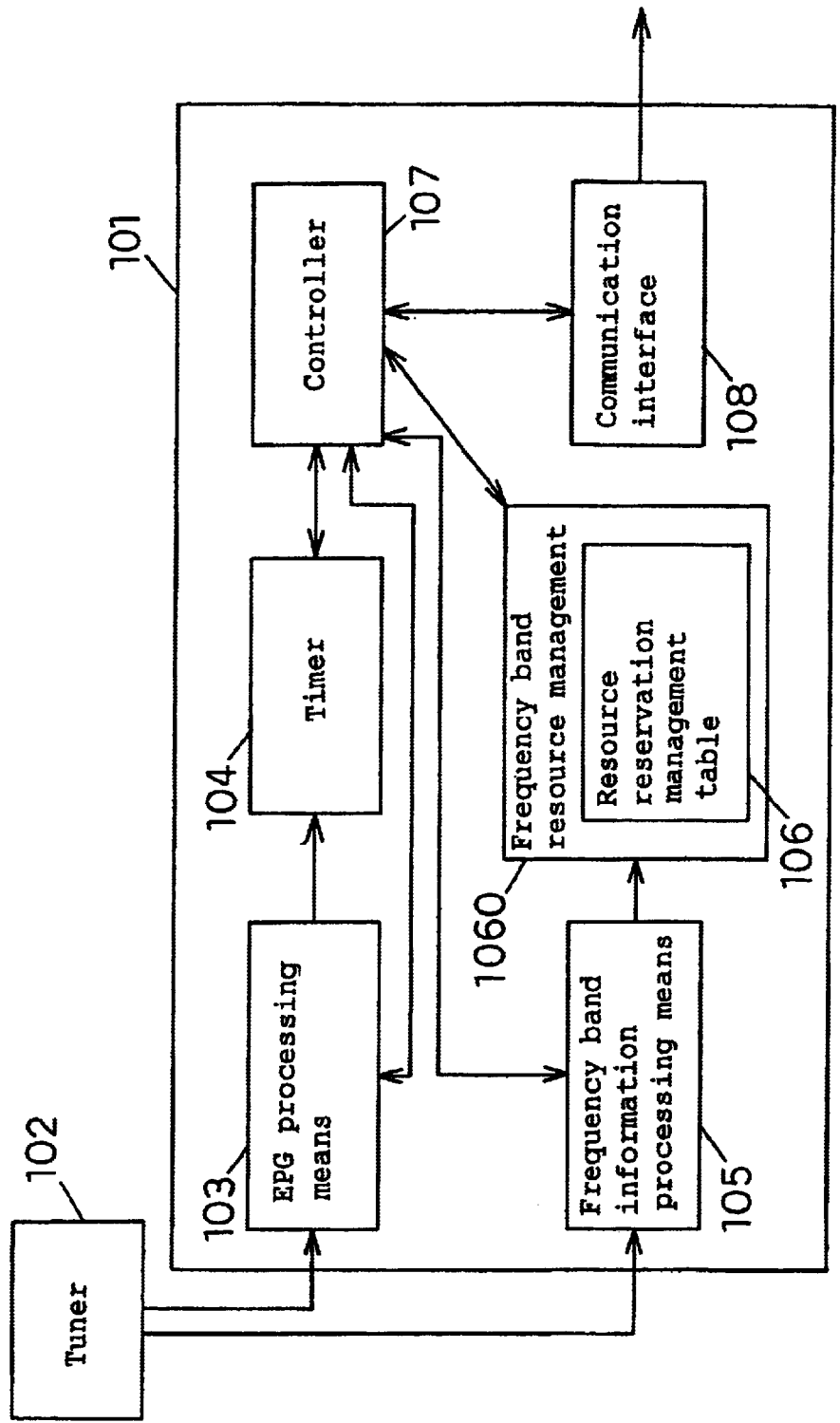
FIG. 1 shows the constitution of a resource reservation management apparatus according to the first embodiment of the present invention.

101: Resource reservation management apparatus
102: Tuner
103: EPG processing means
104: Timer
105: Frequency band information processing means
106: Resource reservation management table
107: Controller
108: Communication interface
201: Resource reservation management apparatus
202: Tuner
203: Modem
204: EPG processing means
205: Timer
206: Frequency band information processing means
207: Resource reservation management table
208: Controller
209: Communication interface
301: Resource reservation management apparatus
302: Tuner
303: Communication equipment
304: EPG processing means
305: Timer
306: Frequency band information processing means
307: Resource reservation management table
308: Controller
309: Communication interface
401: Resource reservation management apparatus
402: Tuner
403: Recording medium
404: EPG processing means
405: Timer
406: Frequency band information processing means
407: Resource reservation management table
408: Controller
409: Communication interface
501: Resource reservation management apparatus
502: Tuner
503: Paper medium
504: EPG processing means
505: Timer
506: Frequency band information processing means
507: Resource reservation management table
508: Controller
509: Communication interface
601: Resource reservation management apparatus
602: Set-top box (STB)
603: Video cassette recorder (VCR)
604: AV data stream
701: Reservable frequency band
702: Non-reservable frequency band
703: Reserved frequency band
704: Newly reserved frequency band
801: Resource management apparatus
802: Frequency band management table
803: Channel management table
804: Controller
805: Communication interface
901: Resource management apparatus
902: Set-top box (STB)
903: Video cassette recorder (VCR)
904: AV data stream

PREFERRED EMBODIMENTS (Embodiment 1)

A resource reservation management apparatus according to the first embodiment of the present invention will now be described below with reference to the accompanying drawings.

FIG. 1 shows the constitution of the resource reservation management apparatus according to the first embodiment of the present invention. In FIG. 1, reference numeral 101 denotes the resource reservation management apparatus, 102 denotes a tuner, 103 denotes EPG processing means, 104 denotes a timer, 105 denotes frequency band information processing means, 106 denotes a resource reservation management table, 1060 denotes frequency band resource management means that manages the frequency band resources by means of the resource reservation management table 106, 107 denotes a controller and 108 denotes a communication interface.

Operation of the resource reservation management apparatus of this embodiment constituted as described above will be described below.

First, the tuner 102 receives broadcast wave that includes the EPG. In the resource reservation management apparatus 101, the EPG processing means 103 extracts program starting/ending time information from the EPG. The time information extracted is managed by the timer 104. On the other hand, frequency band information of the program is extracted by the frequency band information processing means 105 from the broadcast wave. A broadcast station transmits the frequency band information of the programs, too by using EPG. The resource reservation management table 106 stores the frequency band information of a period up to some time in the future.

Upon receipt of a reservation request, the controller 107 acquires the frequency band information and the starting/ending time information of the broad cast program, while making reference to the resource reservation management table 106 to determine whether the frequency band will be available at the time when the program, for which the reservation request has been made, starts. In case the frequency band is available, the controller 107 registers reservation of the frequency band in the resource reservation management table 106 (refer to FIG. 7). At the same time, the timer 104 manages the reservation. The reservation request may be made from either an STB 602 to be described later or a VCR 603.

When the reservation time managed by the timer 104 is reached, the resource reservation management apparatus 101 transmits the program received by the tuner 102 via the communication interface 108 by using the frequency band managed in the resource reservation management table 106 and a channel that is idle at the time. In this way the channel that is idle at the time of recording is utilized.

Figure 6:
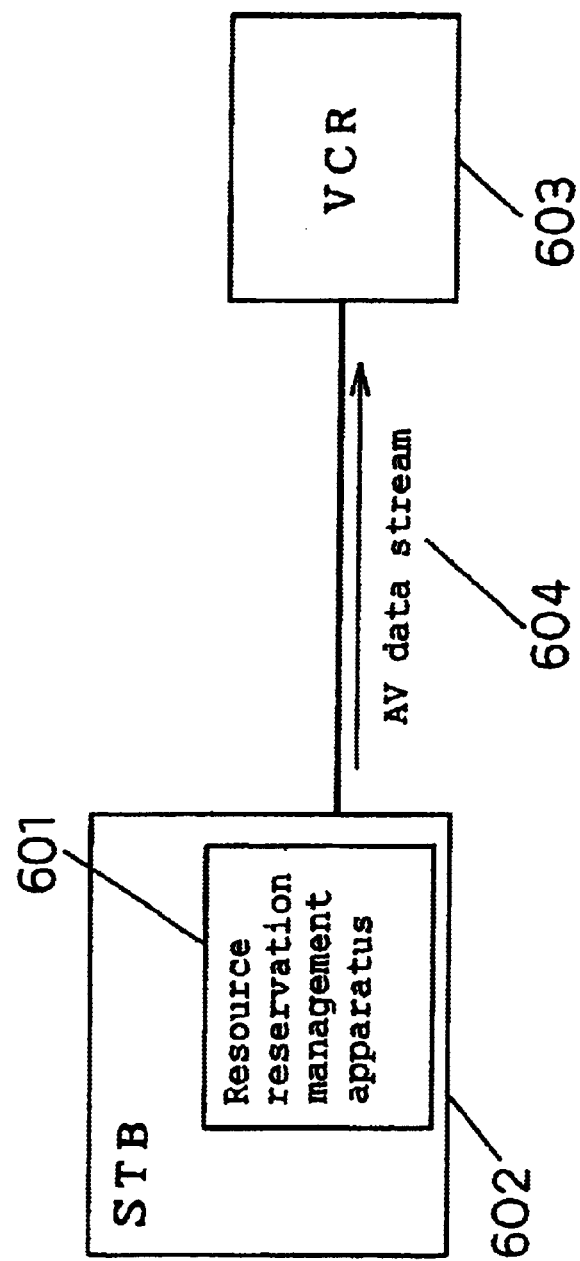
FIG. 6 shows an example of constitution of an AV network provided with the resource reservation management apparatus according to the above embodiments of the present invention.

FIG. 6 shows an example of AV network constitution provided with the resource reservation management apparatus of the first embodiment of the invention.

In FIG. 6, reference numeral 601 denotes the resource reservation management apparatus, 602 denotes the STB, 603 denotes the VCR and 604 denotes the AV data stream. When a digital broadcast program received by the STB 602 is recorded with the VCR 603 with reservation, the resource reservation management apparatus 601 first acquires the program starting/ending time information and the frequency band from the EPG and manages the reservation by taking time into account.

When the time to start recording is reached, the resource reservation management apparatus 601 transmits the AV data stream 604 using the reserved frequency band and a channel that is idle at the time. The VCR 603, on the other hand, can receive and record the AV data stream 604.

Figure 7:
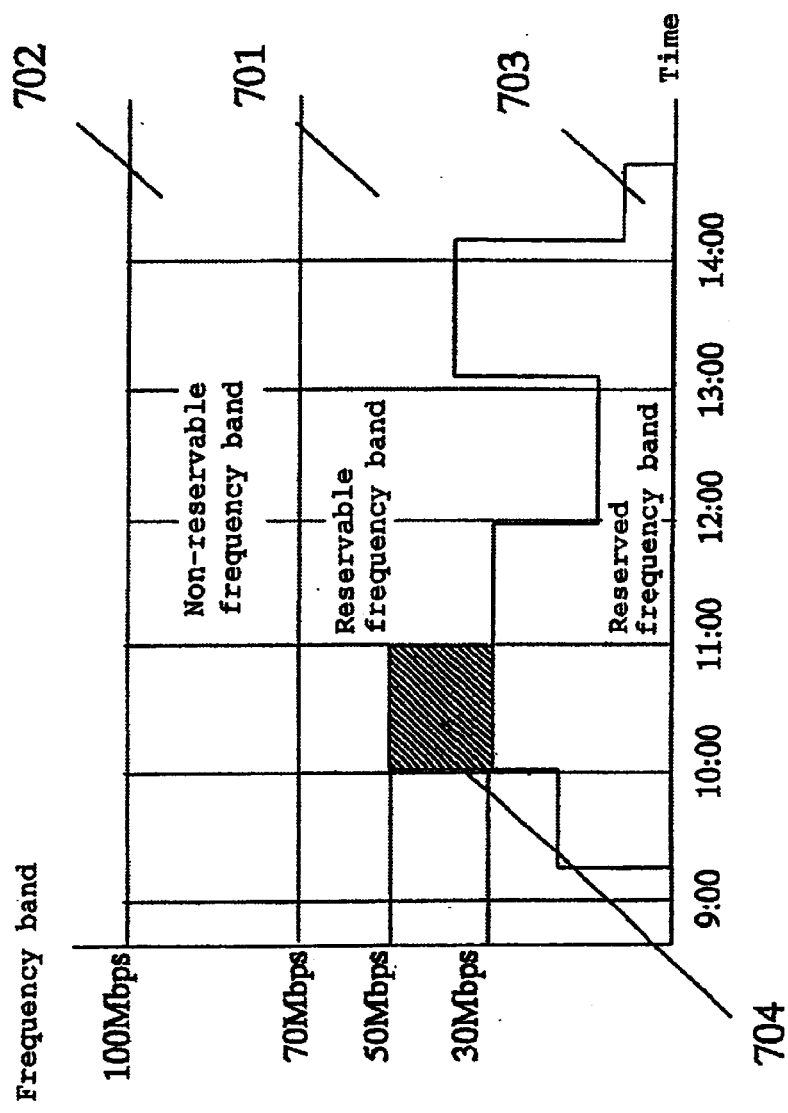
FIG. 7 shows an example of constitution of a resource reservation management table according to the above embodiment of the present invention.
Figure 8:
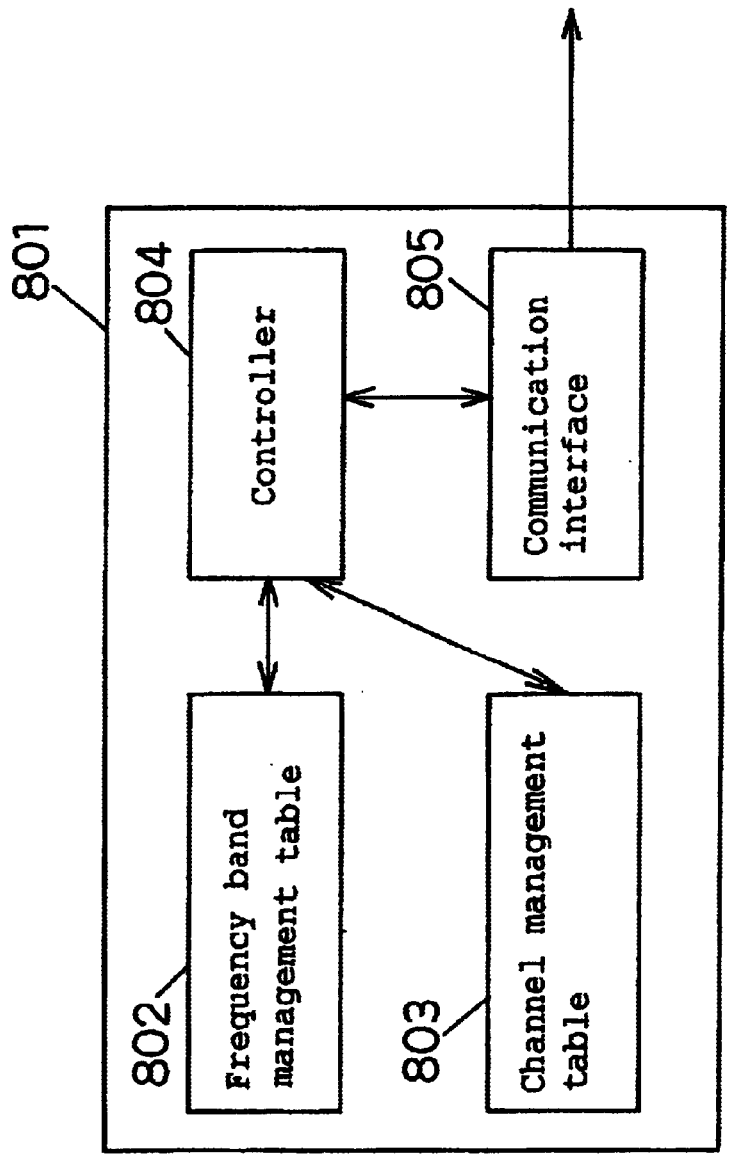
FIG. 8 shows the constitution of a resource management apparatus of the prior art.
Figure 9:
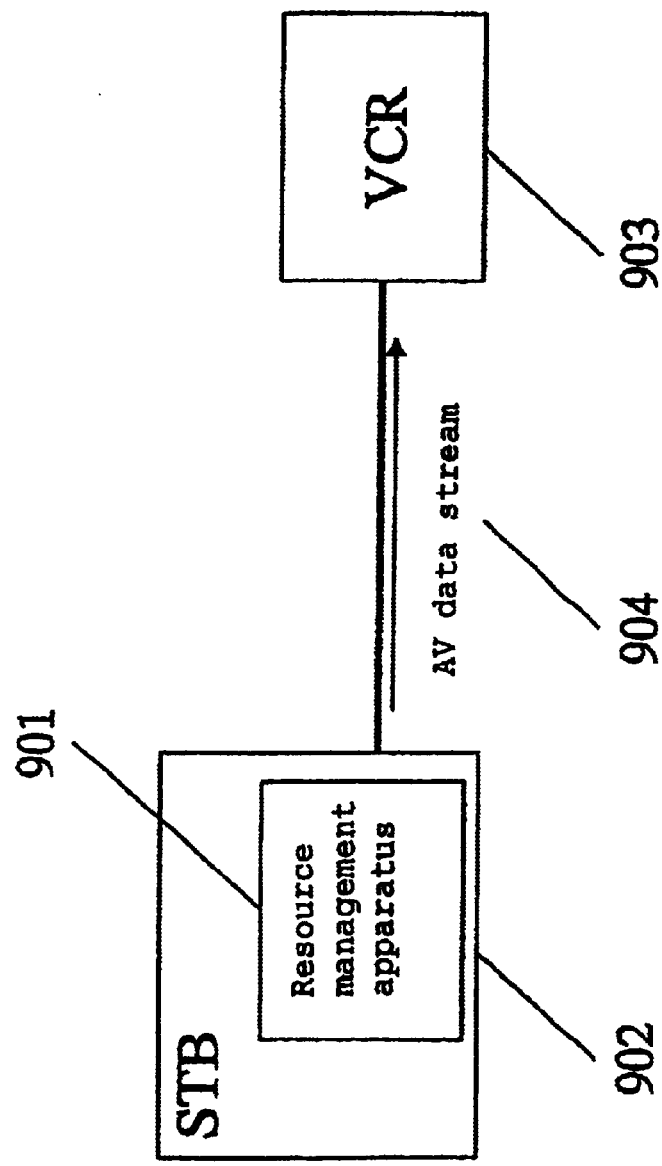
FIG. 9 shows the constitution of an AV network provided with the resource management apparatus of the prior art.

FIG. 7 shows an example of constitution of the resource reservation management table of the first embodiment of the invention. In FIG. 7, reference numeral 701 denotes a reservable frequency band, 702 denotes a non-reservable frequency band, 703 denotes a reserved frequency band and 704 denotes a newly reserved frequency band.

In the resource reservation management table 106, the total frequency band is divided into the reservable frequency band 701 and the non-reservable frequency band 702, and the information on the current frequency band usage status for both frequency bands is kept, while keeping the information on the frequency band reservation status of a period up to some time in the future for the reservable frequency band.

In this embodiment, 70 Mbps out of the total frequency band of 100 Mbps is registered as reservable with the rest being non-reservable. In this example, 30 Mbps is registered as reserved frequency band 703 for a period from 10 to 11 o'clock, while the controller 107 newly reserves 20 Mbps as the newly reserved frequency band 704.

(Embodiment 2)

The resource reservation management apparatus according to the second embodiment of the present invention will now be described below with reference to the accompanying drawings.

Figure 2:
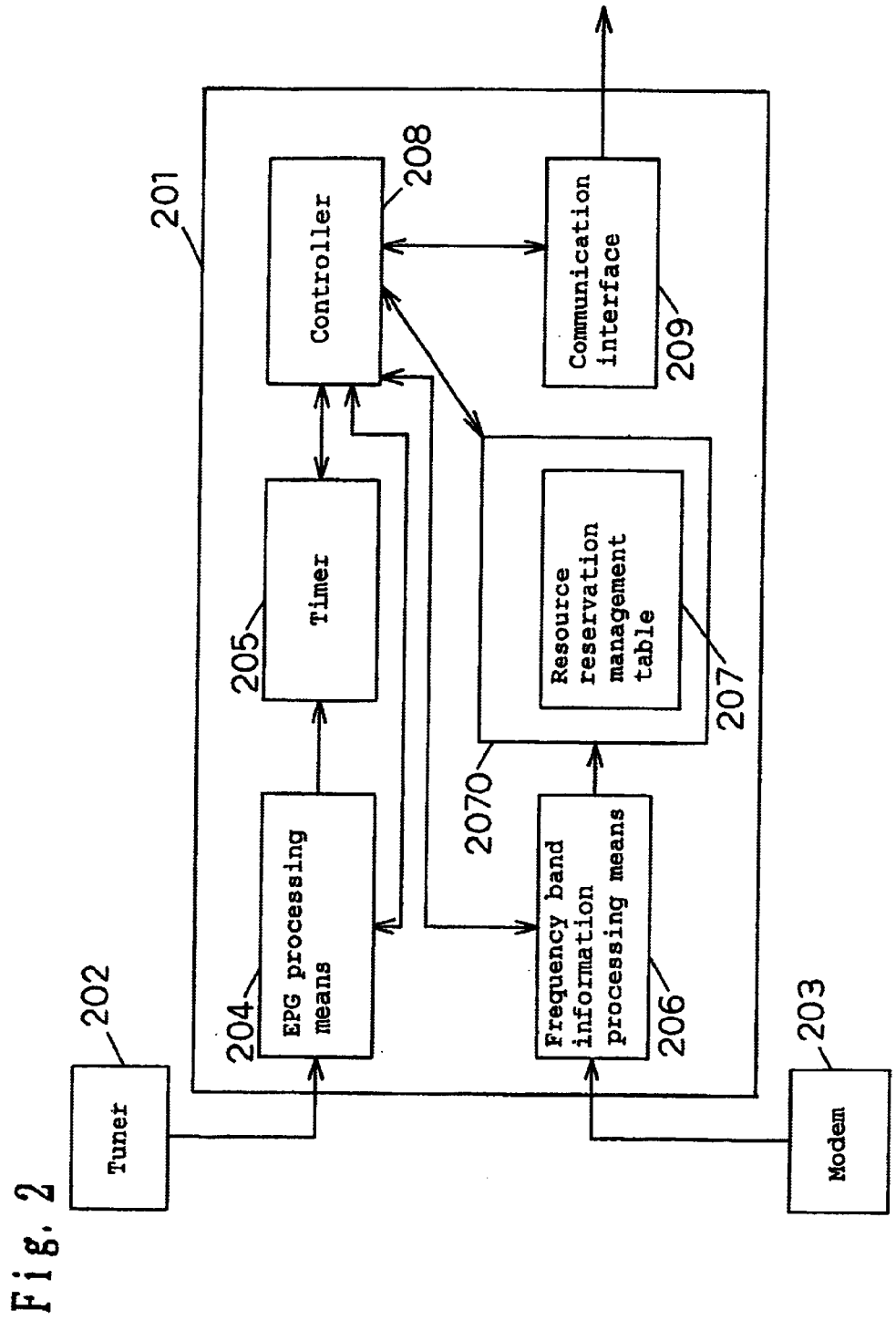
FIG. 2 shows the constitution of a resource reservation management apparatus according to the second embodiment of the present invention.

FIG. 2 shows the constitution of the resource reservation management apparatus according to the second embodiment of the present invention. In FIG. 2, reference numeral 201 denotes the resource reservation management apparatus, 202 denotes a tuner, 203 denotes a modem for connecting to the Internet, 204 denotes EPG processing means, 205 denotes a timer, 206 denotes frequency band information processing means, 207 denotes a resource reservation management table, 2070 denotes frequency band resource management means that manages the frequency band resources by means of the resource reservation management table 207, 208 denotes a controller and 209 denotes a communication interface.

Operation of the resource reservation management apparatus of this embodiment constituted as described above will be described below.

First, the tuner 202 receives broadcast wave that includes the EPG. In the resource reservation management apparatus 201, the EPG processing means 204 extracts program starting/ending time information from the EPG. The time information extracted is managed by the timer 205.

On the other hand, frequency band information of the program is acquired by the frequency band information processing means 206 from the Internet via the modem 203. The resource reservation management table 207 stores frequency band information of a period up to some time in the future.

The controller 208 makes reference to the resource reservation management table 207 to determine whether the frequency band will be available at the start time. In case the frequency band is available, the controller 208 registers reservation of the frequency band in the resource reservation management table 207. At the same time, the timer manages the reservation.

When the recording time managed by the timer 205 is reached, the resource reservation management apparatus 201 transmits the program received by the tuner 202 via the communication interface 209 by using the frequency band managed in the resource reservation management table 207 and a channel that is idle at the time.

FIG. 6 shows an example of AV network constitution provided with the resource reservation management apparatus of the second embodiment of the invention. The operation is similar to that in the first embodiment of the present invention. FIG. 7 shows an example of AV network constitution provided with the resource reservation management table of the second embodiment of the present invention. The operation is similar to that in the first embodiment.

(Embodiment 3)

The resource reservation management apparatus according to the third embodiment of the present invention will now be described below with reference to the accompanying drawings.

Figure 3:
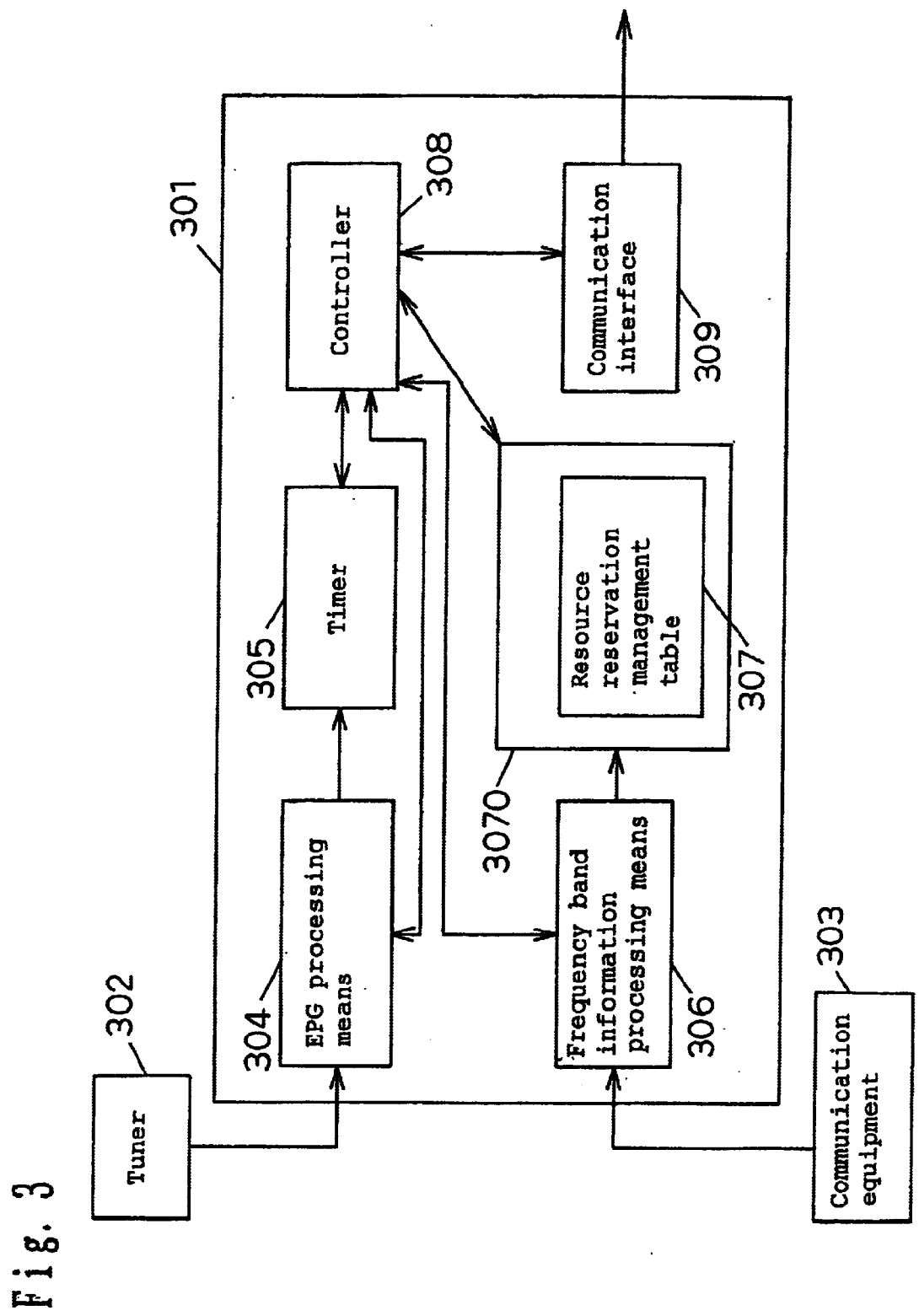
FIG. 3 shows the constitution of a resource reservation management apparatus according to the third embodiment of the present invention.

FIG. 3 shows the constitution of the resource reservation management apparatus according to the third embodiment of the present invention. In FIG. 3, reference numeral 301 denotes the resource reservation management apparatus, 302 denotes a tuner, 303 denotes communication equipment represented by a telephone, 304 denotes EPG processing means, 305 denotes a timer, 306 denotes frequency band information processing means, 307 denotes a resource reservation management table, 3070 denotes frequency band resource management means that manages the frequency band resources by means of the resource reservation management table 307, 308 denotes a controller and 309 denotes a communication interface.

Operation of the resource reservation management apparatus of this embodiment constituted as described above will be described below.

First, the tuner 302 receives broadcast wave that includes the EPG. In the resource reservation management apparatus 301, the EPG processing means 304 extracts the starting/ending time information of the program from the EPG. The extracted information is managed by the timer 305.

On the other hand, frequency band information of the program is acquired via the communication equipment 303 such as telephone in the form of voice data that is extracted by the frequency band information processing means 306.

The resource reservation management table 307 stores the frequency band information of a period up to some time in the future. The controller 308 makes reference to the resource reservation management table 307 to determine whether the frequency band will be available at the start time. In case the frequency band is available, the controller 308 registers reservation of the frequency band in the resource reservation management table 307. At the same time, the timer manages the reservation.

When the recording time managed by the timer 305 is reached, the resource reservation management apparatus 301 transmits the program received by the tuner 302 via the communication interface 309 by using the frequency band managed in the resource reservation management table 307 and a channel that is idle at the time.

FIG. 6 shows an example of AV network constitution provided with the resource reservation management apparatus of the third embodiment of the present invention, of which operation is similar to that in the first embodiment. FIG. 7 shows an example of constitution of the resource reservation management table of the third embodiment of the present invention, of which operation is similar to that in the first embodiment.

(Embodiment 4)

The resource reservation management apparatus according to the fourth embodiment of the present invention will now be described below with reference to the accompanying drawings.

Figure 4:
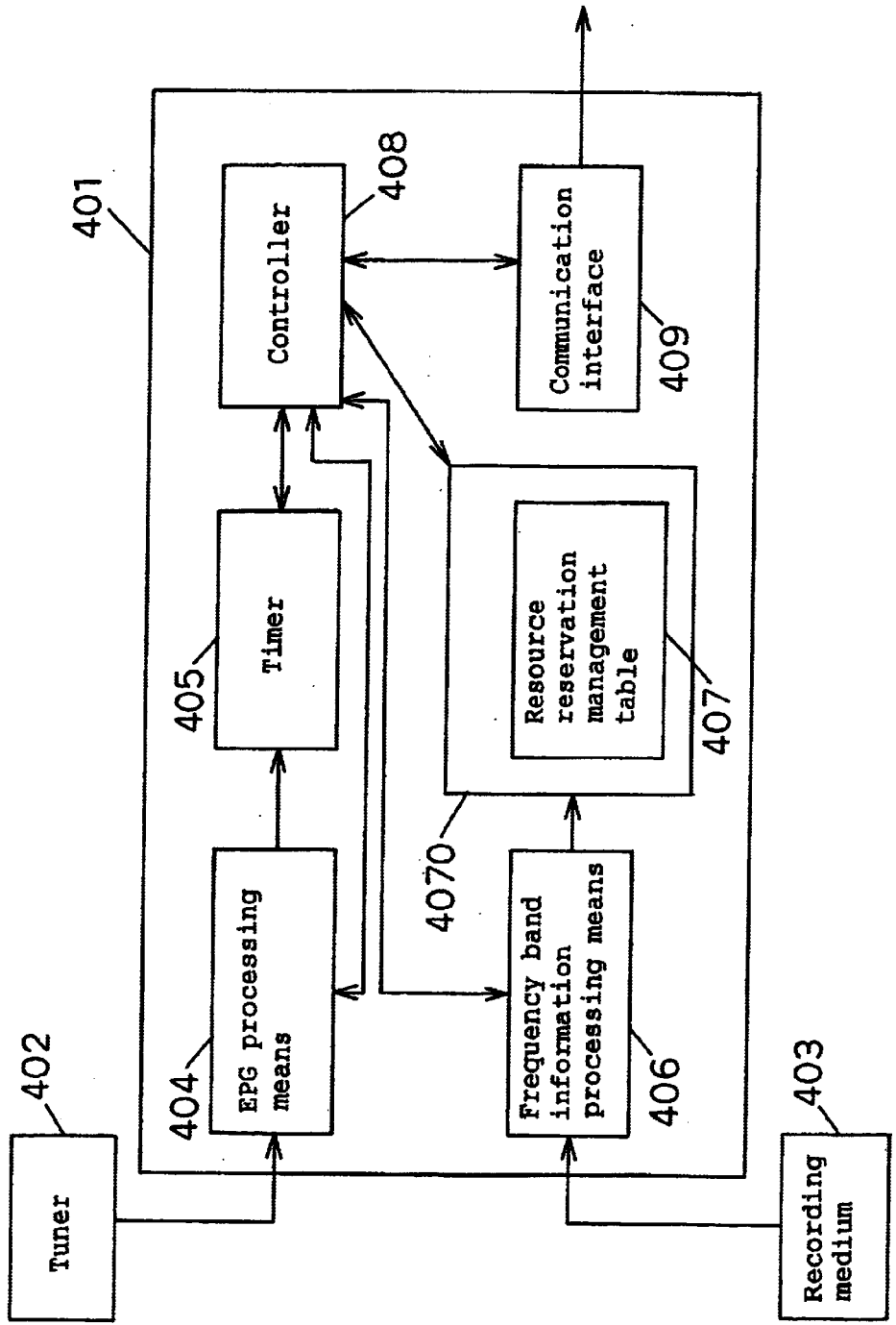
FIG. 4 shows the constitution of a resource reservation management apparatus according to the fourth embodiment of the present invention.

FIG. 4 shows the constitution of the resource reservation management apparatus according to the fourth embodiment of the present invention. In FIG. 4, reference numeral 401 denotes the resource reservation management apparatus, 402 denotes a tuner, 403 denotes a recording medium such as floppy disk or CD-ROM, 404 denotes EPG processing means, 405 denotes a timer, 406 denotes frequency band information processing means, 407 denotes a resource reservation management table, 4070 denotes frequency band resource management means that manages the frequency band resource by means of the resource reservation management table 407, 408 denotes a controller and 409 denotes a communication interface.

Operation of the resource reservation management apparatus of this embodiment constituted as described above will be described below.

First, the tuner 402 receives broadcast wave that includes the EPG. In the resource reservation management apparatus 401, the EPG processing means 404 extracts the starting/ending time information of the program from the EPG. The time information that is extracted is managed by the timer 405.

On the other hand, the frequency band information of the program can be extracted from the recording medium 403 by the frequency band information processing means 406. The resource reservation management table 407 stores the frequency band information of a period up to some time in the future.

The controller 408 makes reference to the resource reservation management table 407 to determine whether the frequency band will be available at the start time. In case the frequency band is available, the controller 408 registers reservation of the frequency band in the resource reservation management table 407. At the same time, the timer manages the reservation.

When the recording time managed by the timer 405 is reached, the resource reservation management apparatus 401 transmits the program received by the tuner 402 via the communication interface 409 by using the frequency band managed in the resource reservation management table 407 and a channel that is idle at the time.

FIG. 6 shows an example of AV network constitution provided with the resource reservation management apparatus of the fourth embodiment of the present invention, of which operation is similar to that in the first embodiment. FIG. 7 shows an example of constitution of the resource reservation management table of the fourth embodiment of the present invention, of which operation is similar to that in the first embodiment.

(Embodiment 5)

The resource reservation management apparatus according to the fifth embodiment of the present invention will now be described below with reference to the accompanying drawings.

Figure 5:
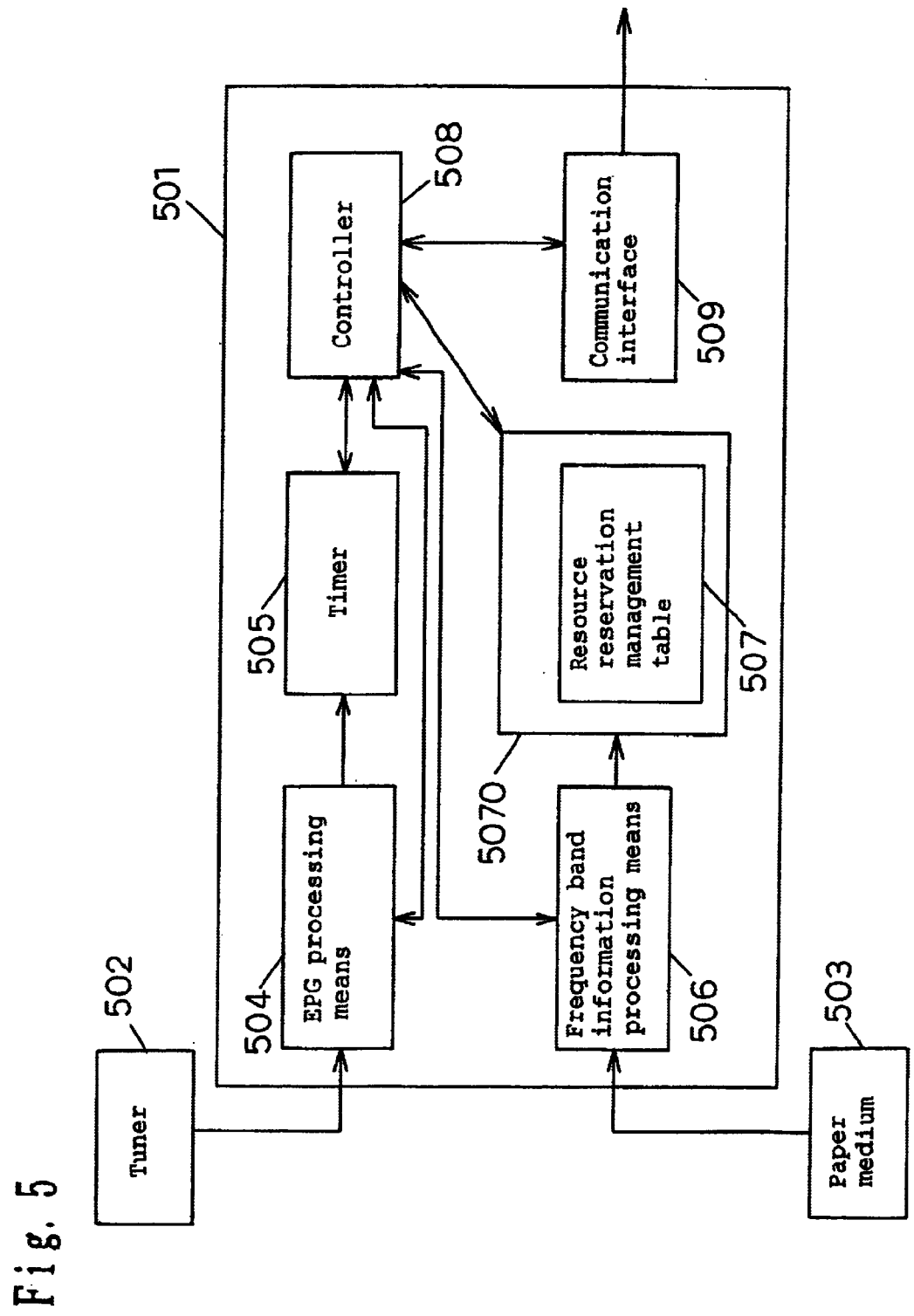
FIG. 5 shows the constitution of a resource reservation management apparatus according to the fifth embodiment of the present invention.

FIG. 5 shows the constitution of the resource reservation management apparatus according to the fifth embodiment of the present invention. In FIG. 5, reference numeral 501 denotes the resource reservation management apparatus, 502 denotes a tuner, 503 denotes a paper medium such as book or news paper, 504 denotes EPG processing means, 505 denotes a timer, 506 denotes frequency band information processing means, 507 denotes a resource reservation management table, 5070 denotes frequency band resource management means that manages the frequency band resource by means of the resource reservation management table 507, 508 denotes a controller and 509 denotes a communication interface.

Operation of the resource reservation management apparatus of this embodiment constituted as described above will be described below.

First, the tuner 502 receives broadcast wave that includes the EPG. In the resource reservation management apparatus 501, the EPG processing means 504 extracts the starting/ending time information of the program from the EPG. The time information that has been extracted is managed by the timer 505.

On the other hand, the frequency band information of the program is entered by a user with reference to the paper medium 503.

The information entered can be extracted by the frequency band information processing means 506. The resource reservation management table 507 stores the frequency band information of a period up to some time in the future.

The controller 508 makes reference to the resource reservation management table 507 to determine whether the frequency band will be available at the start time. In case the frequency band is available, the controller 508 registers reservation of the frequency band in the resource reservation management table 507. At the same time, the timer manages the reservation.

When the recording time managed by the timer 505 is reached, the resource reservation management apparatus 501 transmits the program received by the tuner 502 via the communication interface 509 by using the frequency band managed in the resource reservation management table 507 and a channel that is idle at the time.

FIG. 6 shows an example of AV network constitution provided with the resource reservation management apparatus of the fifth embodiment of the present invention, of which operation is similar to that in the first embodiment. FIG. 7 shows an example of constitution of the resource reservation management table of the fifth embodiment of the invention, of which operation is similar to that in the first embodiment.

Although the channel is not secured when making reservation in the embodiments described above, a channel may be reserved when reserving the frequency band resource as other embodiment.

When there is a command for recording a program immediately without reservation, reference is made to the resource reservation management table to determine whether a channel is available at the time. When available, a program received by the tuner is transmitted via the communication interface to a video recording apparatus using an idle channel.

Although the present invention can be embodied by means of hardware circuit, it can also be embodied in the form of software by using a computer.

The present invention also provides a medium that stores programs for achieving all or part of the functions of the means described above by means of a computer.

The term "data" used herein includes the structure, format, type and other aspects of data.

The term "medium" used herein includes recording medium such as ROM, communication medium such as Internet and transmission medium such as light, electromagnetic wave, sound, etc.

Carrying medium includes, for example, a recording medium carrying programs and/or data recorded thereon and a transmission medium through which programs and/or data are transmitted.

Processability with a computer means that the information can be read by a computer in the case of a recording medium such as ROM, and that the programs and/or data to be transmitted can be handled with a computer as a result of transmission in the case of a transmission medium.

Information complex includes software such as programs and/or data.

According to the present invention, as described above, the frequency band information can be acquired efficiently. And it is made possible to avoid disparity in the opportunity due to differences in the order in the time of reservation and in the order of recording.

What is claimed is:

1. A resource reservation management apparatus for an AV network that manages equipment resources connected to a network, comprising:

EPG processing means for acquiring starting/ending time information of a broadcast program from EPG (electronic program guide) that is sent while being superimposed on the broadcast wave;

frequency band information processing means for acquiring the frequency band information of the broadcast program from the EPG, said frequency band information being bit rate information that is an average data transmitting amount that differs for each broadcast program;

frequency band resource management means for performing time management of the frequency band resource of the AV network by using a resource reservation management table; and a controller that, upon receiving a reservation request, acquires the frequency band of a reserved program of the request from said frequency band information processing means and the starting/ending time information of the reserved program from said EPG processing means and, with reference to said resource reservation management table, determines whether the frequency band of the reserved program can be allocated so that, when the frequency band can be allocated, reservation of the frequency band is registered in said resource reservation management table, wherein communication via a communication interface using allocated secured frequency band is carried out when the start time of the reserved program is reached.

2. A resource reservation management apparatus as described in claim 1, wherein said frequency band information processing means acquires the frequency band information of the broadcast program superimposed on said broadcast wave.

3. A resource reservation management apparatus as described in claim 1, wherein said frequency band information processing means acquires the frequency band information of said broadcast program via the Internet.

4. A resource reservation management apparatus as described in claim 1, wherein said frequency band information processing means acquires the frequency band information of said broadcast program from communication equipment.

5. A resource reservation management apparatus as described in claim 1, wherein said frequency band information processing means acquires the frequency band information of said broadcast program from a recording medium.

6. A resource reservation management apparatus as described in claim 1, wherein said frequency band information processing means acquires the frequency band information of said broadcast program from information input by a user.

7. A resource reservation management apparatus as described in any of claims 1 through 6, wherein in case transmission of a program is requested without reservation, said controller makes reference to said resource reservation management table thereby to determine whether the requested frequency band of the broadcast program can be allocated and, when the frequency band can be allocated, records the reservation of the frequency band in said resource reservation management table.

8. A resource reservation management apparatus as described in any of claims 1 through 6, wherein a non-reservable frequency band is provided in said resource reservation management table.

9. A medium that carries programs and/or data for achieving all or part of the functions of all or part of the means of the resource reservation management apparatus as described in any of claims 1 through 6 and can be processed by means of a computer.

10. An information complex comprising programs and/or data for achieving all or part of the functions, of all or part of the means of the resource reservation management apparatus as described in any of claims 1 through 6, by means of a computer.

* * * * *